US011748281B2

(12) United States Patent
Lesartre et al.

(10) Patent No.: US 11,748,281 B2
(45) Date of Patent: Sep. 5, 2023

(54) REMOTE MEMORY ACCESS USING MEMORY ADDRESS TEMPLATES

(71) Applicant: HEWLETT PACKARD ENTERPRISE DEVELOPMENT LP, Houston, TX (US)

(72) Inventors: Gregg B. Lesartre, Fort Collins, CO (US); Darel Neal Emmot, Wellington, CO (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/514,720

(22) Filed: Oct. 29, 2021

(65) Prior Publication Data
US 2022/0138128 A1    May 5, 2022

Related U.S. Application Data

(60) Provisional application No. 63/107,931, filed on Oct. 30, 2020.

(51) Int. Cl.
*G06F 12/02*    (2006.01)
*G06F 12/06*    (2006.01)
*G06F 13/16*    (2006.01)

(52) U.S. Cl.
CPC ...... *G06F 13/1678* (2013.01); *G06F 12/0238* (2013.01); *G06F 13/1631* (2013.01); *G06F 13/1663* (2013.01); *G06F 12/0646* (2013.01)

(58) Field of Classification Search
CPC ............ G06F 12/0238; G06F 12/0623; G06F 12/063; G06F 12/0646; G06F 16/9017
See application file for complete search history.

(56) References Cited

U.S. PATENT DOCUMENTS

| | | | |
|---|---|---|---|
| 4,891,803 A | 1/1990 | Huang et al. | |
| 5,974,544 A * | 10/1999 | Jeffries | G11B 20/1883 |
| | | | 714/E11.088 |
| 6,940,863 B2 | 9/2005 | Xue et al. | |
| 7,447,233 B2 | 11/2008 | Narad et al. | |
| 7,826,486 B2 | 11/2010 | Calvignac et al. | |
| 2010/0146238 A1* | 6/2010 | Rakib | G06F 12/0284 |
| | | | 711/E12.001 |
| 2016/0117100 A1* | 4/2016 | Choi | G06F 3/067 |
| | | | 710/5 |
| 2019/0121731 A1* | 4/2019 | Khan | G06F 12/0607 |
| 2019/0149486 A1* | 5/2019 | Bohrer | H04L 49/901 |
| | | | 370/474 |
| 2022/0129394 A1* | 4/2022 | Golov | G06F 9/45558 |

OTHER PUBLICATIONS

Mountain, D. et al., "HPC Performance Improvements Through Innovative Architecture," Project 38 Technical Report, Oct. 2019, NCO/NITRD Program, 29 pages.

* cited by examiner

*Primary Examiner* — Tracy A Warren
(74) *Attorney, Agent, or Firm* — Yao Legal Services, Inc.

(57) ABSTRACT

A method comprises receiving a message comprising an identifier for an address template, using the identifier to select the address template from a set of address templates, determining a set of memory addresses for a corresponding set of memory operations using the address template, and executing the memory operations.

17 Claims, 3 Drawing Sheets

REMOTE MEMORY ACCESS USING MEMORY ADDRESS TEMPLATES

BACKGROUND

HPC Communication patterns may include large numbers of small messages targeting multiple destinations on the system fabric, including Fabric Attached Memory (FAM) nodes accessible by any node in the system. Small messages stress the system fabric bandwidth since only a small data payload is delivered, yet the fabric header overhead is just as large as for larger messages. As a result message bandwidth seen on the fabric is reduced for small messages relative to larger messages.

BRIEF DESCRIPTION OF THE DRAWINGS

Certain examples are described in the following detailed description and in reference to the drawings, in which.

DETAILED DESCRIPTION OF SPECIFIC EXAMPLES

Implementations of the described technology, may improve the efficiency of network operations by reducing the bandwidth impact of small message traffic. Network nodes, such as computers and fabric attached memory (FAM), may share a common library of address templates. The address templates are used to determine a set of memory addresses associated with a corresponding set of memory operations. At a message sender side, a plurality of small messages implementing the memory operations may be replaced by an identifier to an address template at the receiver side. At the receiver side the plurality of memory operations may be reconstructed using the address template identified by the identifier contained in the message.

Figure 1:
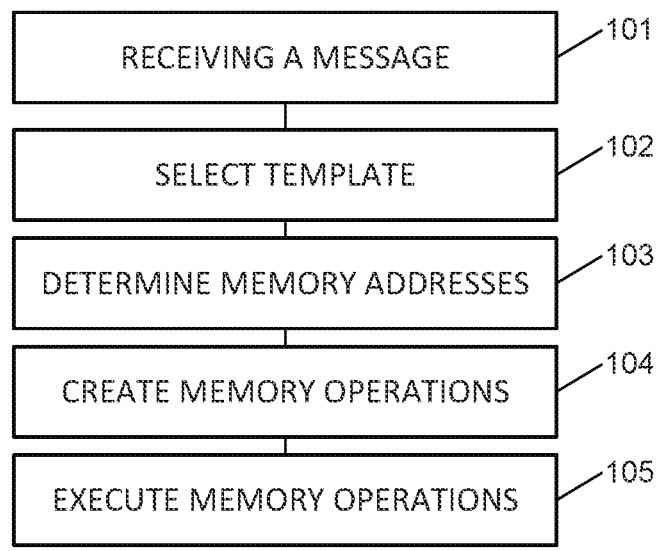
FIG. 1 illustrates an example method of receiver side message handling.

FIG. 1 illustrates an example method of receiver side message handling. The method may be performed by an initiator of small message traffic, such as a compute node. For example the small message traffic may be memory semantic operations targeting memory addresses, such as direct memory access transactions, load/store operations, or more advanced functionality such as atomic operations like compare and swap. Additionally, the method may be performed by a recipient or participant in small message traffic, such as a fabric attached memory module.

The method begins with block 101. Block 101 comprises receiving a message including an address template identifier. As discussed below, the message corresponds to a set of memory operations that are determined using a memory address template identified by the identifier. For example, the message may comprise a packet received over an Ethernet network, an InfiniBand network, or various HPC interconnects. In some cases, the message may include data, such as data for operations at the addresses corresponding to the identified address template. In some implementations, the message does not include any memory addresses. Rather, all memory addresses for the memory operations may be determined from the address template.

The message may also include parameters to be used with the corresponding address template. For example, the parameters may include input parameters to be used to derive the addresses from the address template. As another example, the parameters may include formatting parameters that may be used to format the response message, or interpret the format of the received message.

The method continues with block 102. Block 102 comprises using the identifier to select a corresponding address template from a set of address templates. For example, the set of address templates may be a library shared by both parties. In some implementations, the library may be pre-programmed. For example, the library may be programmed during initial system configuration. In further implementations, the library may be programmed or modified during system operation.

The method further includes block 103. Block 103 includes determining a set of memory addresses for a corresponding set of memory operations using the address template. For example, the address template may include a set of specific addresses for the memory operations. Here, block 103 may comprise retrieving the set of specific memory addresses stored in the address template. As an example, a FAM may store a data structure that represents three dimensional data. An address template may be defined to correspond to the specific addresses of a particular two dimensional plane intersecting the 3d data structure. A read of the data in that plane may be implemented by sending an identifier to that address template in a read operation. Compared a command that strides through the data structure, the use of the address identifier may allow the data retrieval for any arbitrary plane through the 3D data with reduced message traffic. As another example, the address template may be for a predefined strided memory access pattern, where stride parameters are stored in the template. For example, the difference between successive memory addresses as well as the size of data to return for each access.

As another example, an address template may comprise a function to determine the memory addresses from parameters included in the message. Here, block 103 may comprise deriving the set of memory addresses based on the information stored in the address template as well as the parameters included in the message. Returning to the 3d data structure as an example, the parameters might provide the basis vectors for a desired two dimensional plane, so that a single template may be used to every 2D plane rather than having a template dedicated to a particular plane. Returning to the strided access pattern example, the parameters might provide the starting address for the predefined stride pattern.

The method continues with block 104. In block 104 the creating the memory operations corresponding to the identifier. For example, the receiving device may have a memory controller attached to local memory, and block 104 may comprise generating a set of operations to be executed using the memory controller over the interconnect to its local memory. In some implementations, the message received in block 101 includes the type of memory operation in addition to the memory address templates. Here, block 104 comprises creating a set of memory operations corresponding to the type indicated in the message and the addresses determined in block 103. If the message further included data, block 104 comprises parsing and including the data in the memory operations. As an example, the message from block 101 may include a write indicator, an identifier to a template, and data to be written to those addresses. In this example, block 104 comprises generating a corresponding set of memory writes by creating a write request for each address determined in block 103, where each write includes a corresponding portion of the data from the message. As another example, the message from block 101 may include an identifier to a template that defines a plurality of read operations at a set of predetermined memory addresses. In this example, block 104 comprises generating the corresponding set of memory reads at the addresses defined by the template.

The method further includes block 105. Block 105 comprises executing the memory operations. If required by the operations or message block 105 further comprises returning a response message to the message of block 101. For example, block 105 may comprise returning the data that results from the memory operations of block 104. As an example, if the operations were read operations, block 105 may comprises returning the read data to the read requestor. In some cases, block 105 may comprise returning the result using an address template. For example, the return message might include the same identifier received in block 101, and, if applicable, the parameters needed to derive the addresses using the address template. Here, the receiving entity (e.g., the entity that sent the message in block 101) may perform the method of FIG. 1 to complete the memory transaction. As another example, the result may be sent as a plurality of result messages (possibly aggregated into a single message) that include memory addresses and data. Here the receiving entity may perform operations in the result messages directly without reconstruction. In some examples, the message in block 101, or the address template, may include information that defines the response message format. In these examples, block 105 comprises returning the response using the requested format.

Figure 2:
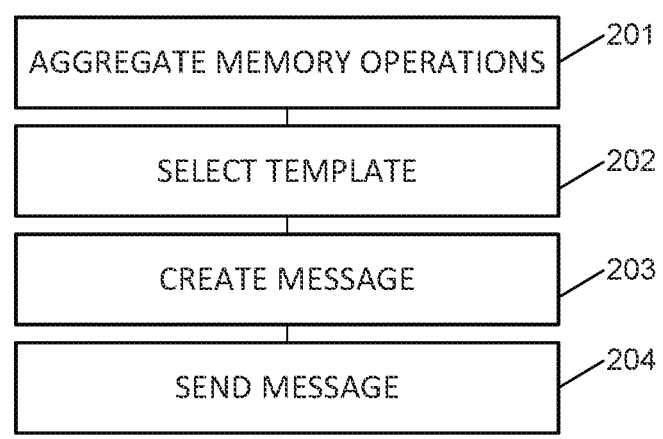
FIG. 2 illustrates an example method of sending a message that include an identifier for an address template.

FIG. 2 illustrates an example method of sending a message that include an identifier for an address template. For example, the illustrated method may be performed in conjunction with the method of FIG. 1. For example, the method of FIG. 2 may be performed by the device that sent the message received in block 101 of FIG. 1. As another example, the method of FIG. 2 may be performed as part of block 105 of FIG. 1.

The method includes block 201. Block 201 comprises collecting a plurality of memory operations. For example, block 201 may be performed by collecting a software interface layer that receives memory operations generated by the application that generated the memory operations. As another example, block 201 may be performed by the application that generates the memory operations. In some examples, block 201 may be performed by collecting a set of memory operations that target addresses included in an address template. As another example, block 201 may be performed by executing a command to perform the memory operations that match an address template in the library. For example, block 201 may be performed in response to an application calling a function corresponding to an address template in the shared library of templates.

The method further includes blocks 202-204. Block 202 comprises selecting a template corresponding to the collected memory addresses and determining the identifier for the selected template. Block 203 comprises creating the message to be sent in lieu of the collected memory addresses. For example, block 203 may comprise generating the message including the identifier to the selected template as well as any required parameters. For example, the generated message may be formatted as described with respect to the message received in block 101 of FIG. 1 or the message sent in block 105. Block 204 comprises sending the message. For example, block 204 may comprise sending the message as a resource request to a responding device. As another example, block 204 may comprise sending the message as a response to a previous resource request.

Figure 3:
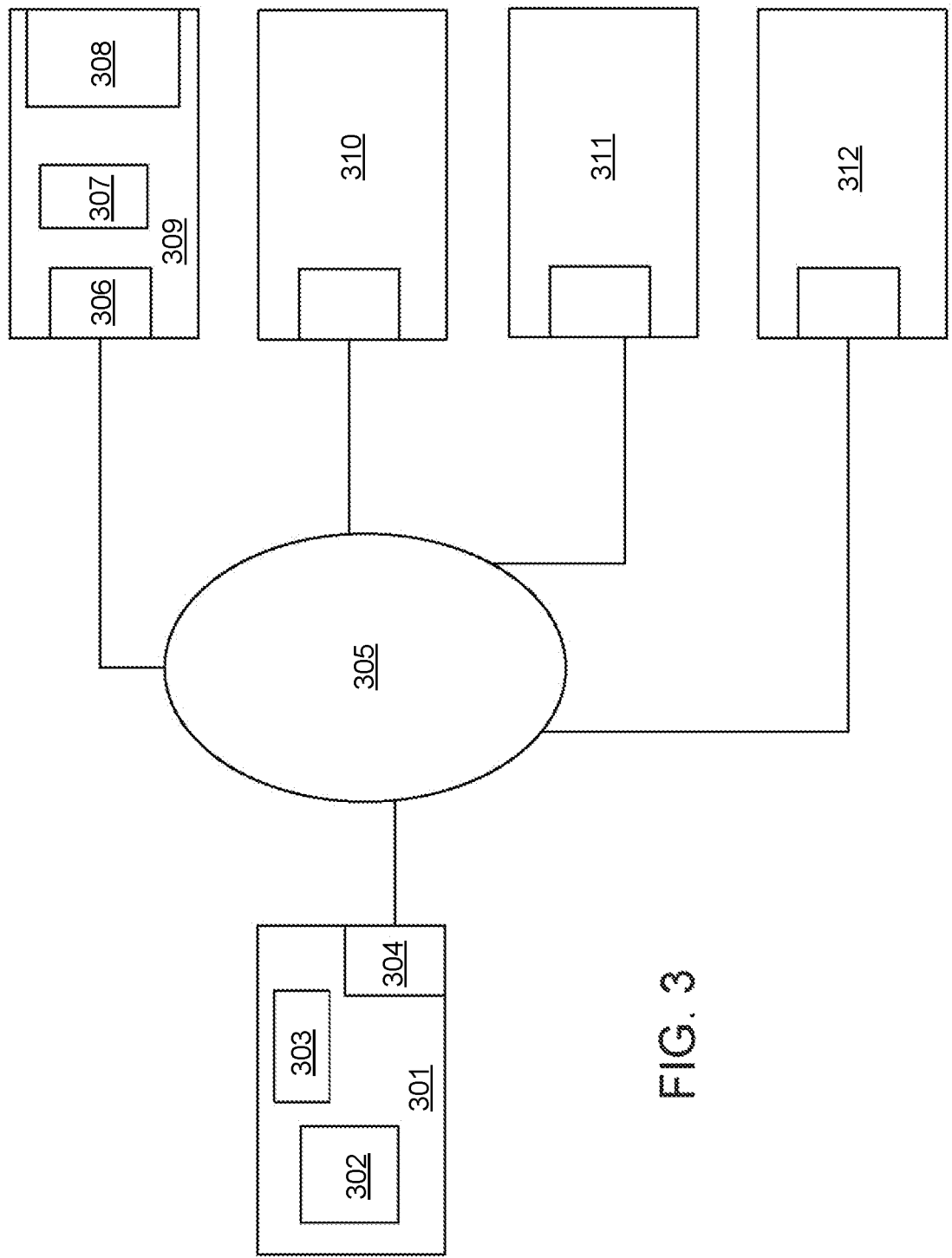
FIG. 3 illustrates an example system deployment included devices configured with logic to perform methods as described with respect to FIGS. 1 and 2.

FIG. 3 illustrates an example system deployment included devices configured with logic to perform methods as described with respect to FIG. 1 or 2. For example, the logic may be implemented as software, firmware, hardware, or a combination thereof.

The system includes a plurality of nodes 301, 309, 310, 311, 312 connected to an interconnect 305. For example, the nodes may be fabric attached memory nodes, compute nodes, storage nodes, accelerators, or components of a networked computer system. The interconnect 305 may comprise an ethernet network, an Infiniband network, or other fabric. While the illustrated example includes four nodes, actual deployments may include hundreds or thousands of nodes.

Example node 301 comprises a compute node. The compute node device 301 may include various computer componentry for the execution of general code. For example, the node 301 may comprise a compute node in a clustered computer system, a cache-coherent non-uniform memory access (ccNUMA) computer system, or a combination thereof. The example node 301 includes a CPU 302, local memory 303, and an external interface 304 connected to the interconnect 305. The node 301 may comprise further components, such as storage, GPU(s), accelerator(s), etc. . . .

In this example, the interface 304 is to receive a message comprising an identifier for an address template. For example, the message may be as described with respect to block 101 of FIG. 1.

The node 301 further comprises logic to use the identifier to select the address template from a set of address templates, determine a set of memory addresses for a corresponding set of memory operations using the address template, and execute the memory operations. The logic may be executed to perform a method as described with respect to FIG. 1. Here the logic comprise software stored in memory 303 and executed by processor 302, as well as memory controller hardware/firmware in processor 302 to execute memory operations on the local memory 303. For example, as described with respect to FIG. 1, the node 301 may be a requestor that previously performed a memory-addressed resource request involving a set of memory operations, and the logic may be executed to receive a response. As another example, the node 301 may be acting as a responder device to execute memory semantic operations requested As another example, the system may include a FAM module 309. The FAM module 309 provides additional memory 308 accessible by the other devices on the network. In this example, the node 309 comprises an interface to send and receive messages on the network. The node further comprises a controller 307. The controller 307 manages the execution of requests and responses received from or sent over the interface 306, and which target memory addresses in memory 308. For example, the controller 307 may comprise a general purpose processor such as a process similar to processor 303 of the compute node 301. As other examples, the controller 307 may comprise an embedded processor running firmware, a hardware ASIC, or a combination of any of these implementations. In this example, the node 309 comprises logic executed by the controller to perform the method described with respect to FIG. 1.

Figure 4:
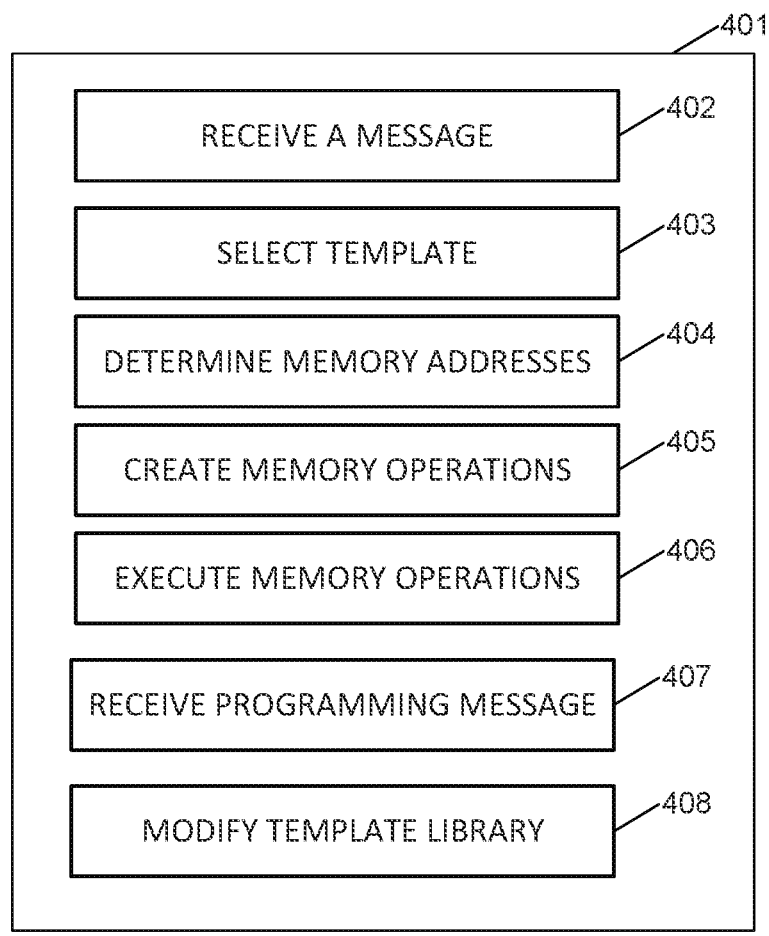
FIG. 4 illustrates a first example non-transitory computer readable medium.

FIG. 4 illustrates an example non-transitory computer readable medium 401, such as memory or storage. The medium 401 stores code 402-406 that is executable by a processor (such as processor 302 of node 301 or controller 307 of node 309) to perform a method as described with respect to FIG. 1.

The medium includes code block 402 that is executable to receive a message comprising an identifier for an address template. For example, block 402 may be executable as described with respect to block 101 of FIG. 1.

The medium further includes code block 403 that is executable to use the identifier to select the address template from a set of address templates. For example, block 403 may be executable as described with respect to block 102 of FIG. 1.

The medium further includes code block 404 that is executable to determine a set of memory addresses for a corresponding set of memory operations using the address template. For example, block 404 may be executable as described with respect to block 103 of FIG. 1.

The medium further includes code block 405 that is executable to create the memory operations using the corresponding set of memory address and the data from the message. For example, block 405 may be executable as described with respect to block 104 of FIG. 1.

The medium further includes code block 406 that is executable to use the identifier to execute the memory operations. For example, block 406 may be executable as described with respect to block 105 of FIG. 1.

As described above, the template library may be programmable during system operation. In these examples, the medium 401 may include block 407 to receive a template programming message and block 408 to modify the template library. For example, the template programming message may be a message to modify an existing template identified by an existing identifier. As another example, the template programming message may be a message to add a new template identified by a new identifier to the library.

Figure 5:
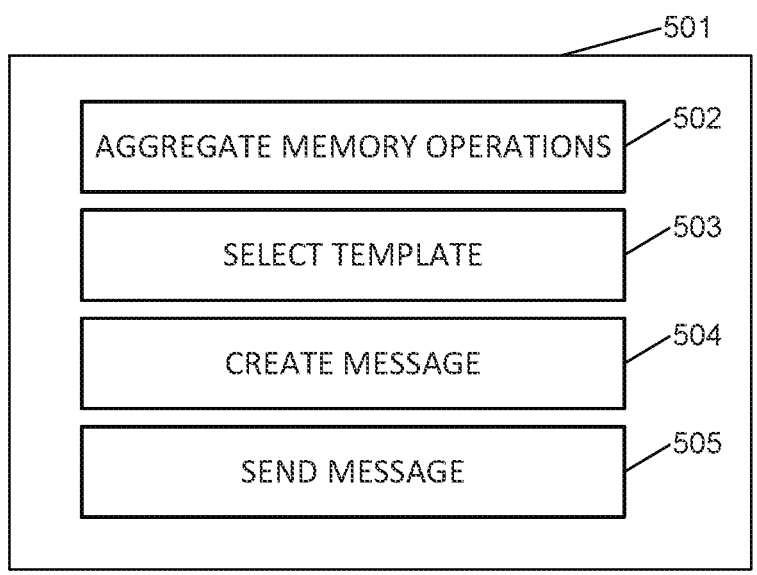
FIG. 5 illustrates a second example non-transitory computer readable medium.

FIG. 5 illustrates an example non-transitory computer readable medium 401, such as memory or storage. The medium 501 stores code 502-505 that is executable by a processor (such as processor 302 of node 301 or controller 307 of node 309) to perform a method as described with respect to FIG. 2.

The medium includes code block 502 that is executable to receive a message comprising an identifier for an address template. For example, block 402 may be executable as described with respect to block 201 of FIG. 2.

The medium further includes code block 503 that is executable to use the identifier to select the address template from a set of address templates. For example, block 503 may be executable as described with respect to block 202 of FIG. 2.

The medium further includes code block 504 that is executable to determine a set of memory addresses for a corresponding set of memory operations using the address template. For example, block 504 may be executable as described with respect to block 203 of FIG. 2.

The medium further includes code block 505 that is executable to create the memory operations using the corresponding set of memory address and the data from the message. For example, block 505 may be executable as described with respect to block 205 of FIG. 1.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

The invention claimed is:

1. A method comprising:
   receiving, by a controller of a fabric attached memory (FAM) device from a compute node coupled to the FAM device, a message corresponding to a plurality of memory operations targeting a set of memory addresses, wherein the message comprises an identifier for an address template without including any memory address;
   using the identifier to select the address template from a set of address templates, wherein the address template includes an operation identifier for the memory operations;
   using the selected address template to determine the set of memory addresses;
   generating the plurality of memory operations based on the received message and the determined set of memory addresses; and
   executing, by the controller, the plurality of memory operations on the set of memory addresses, wherein executing a respective memory operation comprises the controller accessing a corresponding memory address on the FAM device to write data to or read data from the corresponding memory address.

2. The method of claim 1, wherein:
   the message further comprises a parameter for the address template; and
   determining the set of memory addresses comprises applying the parameter to the address template.

3. The method of claim 1, wherein the address templates of the set of address templates are programmable.

4. The method of claim 1, further comprising:
   receiving a second message comprising a definition for a new address template; and
   adding the new address template to the set of address templates.

5. The method of claim 1, wherein the second message is received in-band with the first message.

6. The method of claim 1, wherein the message comprises data for the memory operations; and
   wherein the plurality of memory operations are generated using the corresponding set of memory address and the data from the message.

7. A controller of a fabric attached memory (FAM) device comprising:
   an interface to receive a message corresponding to a plurality of memory operations targeting a set of memory addresses, wherein the message comprises an identifier for an address template without including any memory address; and
   logic to:
      use the identifier to select the address template from a set of address templates, wherein the address template includes an operation identifier for the memory operations;
      use the selected address template to determine the set of memory addresses;
      generate the plurality of memory operations based on the received message and the determined set of memory addresses; and
      execute the plurality of memory operations on the set of memory addresses, wherein executing a respective memory operation comprises the controller accessing a corresponding memory address on the FAM device to write data to or read data from the corresponding memory address.

8. The controller of claim 7, wherein:
the message further comprises a parameter for the address template; and
determining the set of memory addresses comprises applying the parameter to the address template.

9. The controller of claim 7, wherein the address templates of the set of address templates are programmable.

10. The controller of claim 9, wherein the logic is to:
receive a second message comprising a definition for a new address template; and
add the new address template to the set of address templates.

11. The controller of claim 10, wherein the second message is received in-band with the first message.

12. A non-transitory computer readable medium storing code that when, when executed, causes a processor to:
receive, by a controller of a fabric attached memory (FAM) device from a compute node coupled to the FAM device, a message corresponding to a plurality of memory operations targeting a set of memory addresses, wherein the message an identifier for an address template without including any memory address;
use the identifier to select the address template from a set of address templates,
wherein the address template includes an operation identifier for the memory operations;
using the selected address template to determine the set of memory addresses;
generate the plurality of memory operations based on the received message and the determined set of memory addresses; and
execute, by the controller, the plurality of memory operations on the set of memory addresses, wherein executing a respective memory operation comprises the controller accessing a corresponding memory address on the FAM device to write data to or read data from the corresponding memory address.

13. The medium of claim 12, wherein:
the message further comprises a parameter for the address template; and
the code further causes the processor to determine the set of memory addresses comprises applying the parameter to the address template.

14. The medium of claim 12, wherein the address templates of the set of address templates are programmable.

15. The medium of claim 14, wherein the code is to:
receive a second message comprising a definition for a new address template; and
add the new address template to the set of address templates.

16. The medium of claim 15, wherein the second message is received in-band with the first message.

17. The medium of claim 12, wherein the message comprises data for the memory operations; and
wherein the plurality of memory operations are generated using the corresponding set of memory address and the data from the message.

* * * * *